United States Patent [19]

Gaiser et al.

[11] 4,249,379
[45] Feb. 10, 1981

[54] FLUID PRESSURE GENERATOR AND VALVE MEMBER THEREFOR

[75] Inventors: Robert F. Gaiser, Stevensville; Larry G. Lohraff, Berrien Spring, both of Mich.

[73] Assignee: The Bendix Corporation, Southfield, Mich.

[21] Appl. No.: 936,272

[22] Filed: Aug. 23, 1978

[51] Int. Cl.$^3$ ............................................. B60T 11/20
[52] U.S. Cl. .................................... 60/562; 60/534; 60/561; 60/588; 60/591
[58] Field of Search ................. 60/561, 562, 591, 534, 60/588

[56] References Cited

U.S. PATENT DOCUMENTS

| 3,938,333 | 2/1976 | Mathues | 60/591 |
| 4,027,482 | 6/1977 | Manzini | 60/591 |
| 4,078,384 | 3/1978 | Shutt | 60/535 |
| 4,117,681 | 10/1978 | Falk | 60/591 |

FOREIGN PATENT DOCUMENTS 2253653 12/1973 France ....................................... 60/591

Primary Examiner—Abraham Hershkovitz
Attorney, Agent, or Firm—Paul David Schoenle; Ken C. Decker

[57] ABSTRACT

A fluid pressure generator, such as a master cylinder, includes a housing with a bore for movably supporting a pair of pistons. The pair of pistons cooperate with the housing and with each other to substantially define a pair of pressure chambers which are communicated with respective brake assemblies. A first piston of the pair of pistons is movable within the housing to pressurize a primary pressure chamber and the second piston of the pair of pistons is movable in response to pressurized fluid within the primary pressure chamber so as to pressurize a secondary pressure chamber. The second piston carries a valve assembly and includes a passage to provide fluid communication between the secondary pressure chamber and its respective brake assembly. The valve assembly is movable in response to the pressure of fluid within the secondary pressure chamber and a shuttle member is movable in response to a pressure variation between the primary pressure chamber and the secondary pressure chamber to move the valve assembly to a position opening the passage. The valve assembly is disposed within the second piston and is defined by a sleeve and a pilot member. The sleeve slidably receives the shuttle member within a bore on the sleeve and the pilot member is connected to the shuttle member.

9 Claims, 3 Drawing Figures

FLUID PRESSURE GENERATOR AND VALVE MEMBER THEREFOR

BACKGROUND OF THE INVENTION

A proportioning valve cooperates with a master cylinder and operates during braking to communicate less pressurized fluid to one brake assembly than to another brake assembly. The proportioning of pressurized fluid to a set of brake assemblies, generally being front disc and rear drum brakes, is provided to account for the increased braking of the front disc brakes.

The proportioning valve of the prior art is generally disposed within a housing outlet passage communicating with the rear drum brakes. As a result, the housing required structural modifications to accommodate the proportioning valve as well as a bypass valve which operates when the front disc brakes are in a failure mode so as to fully apply the rear drum brakes regardless the position of the proportioning valve.

SUMMARY OF THE INVENTION

The present invention provides a proportioning valve assembly and bypass passage for use in a master cylinder or fluid pressure generator having a housing which cooperates with a pair of pistons to define a pair of pressure chambers. The pair of pressure chambers communicate, respectively, to a front brake assembly and a rear brake assembly. The first piston of the pair of pistons is movable within the housing in response to an operator actuator to pressurize a primary pressure chamber directly communicating with one of the brake assemblies and the second piston of the pair of pistons is movable in response to pressurized fluid within the primary pressure chamber so as to pressurize fluid within a secondary pressure chamber. The second piston defines a cavity therein for carrying a shuttle member and a valve assembly and the housing defines outlet ports communicating with the front and rear brake assemblies, respectively. A passage within the second piston provides for fluid communication between the secondary pressure chamber and its corresponding brake assembly via one of the outlet ports.

The valve assembly within the second piston is movable in response to the fluid pressure within the secondary chamber to restrict fluid communication through the passage to the brake assembly associated with the secondary pressure chamber. If the shuttle member senses a pressure variation between the pair of pressure chambers, for example when the primary pressure chamber fluid pressure decreases as a result of a failure in the corresponding brake assembly, the shuttle member is movable to position the valve assembly such that unrestricted communication is established between the secondary pressure chamber and its corresponding brake assembly.

In particular, the valve assembly comprises a sleeve which is movable in response to pressurized fluid within the secondary chamber. A pilot member is disposed within the sleeve and extends into a sleeve opening to vary the fluid flow therethrough as the sleeve moves relative to the pilot member. The pilot member is connected to the shuttle member and the latter is movably received within a sleeve bore. A ring element is movable in response to pressurized fluid within the secondary chamber in order to position the shuttle member within the second piston and the ring element movably receives the sleeve within a bore on the ring element.

It is a primary object of the present invention to provide a proportioning valve assembly which is disposed within a piston in a master cylinder. The proportioning valve assembly cooperates with a passage in the piston to restrict or vary fluid communication to a corresponding brake assembly.

DETAILED DESCRIPTION

Figure 1:
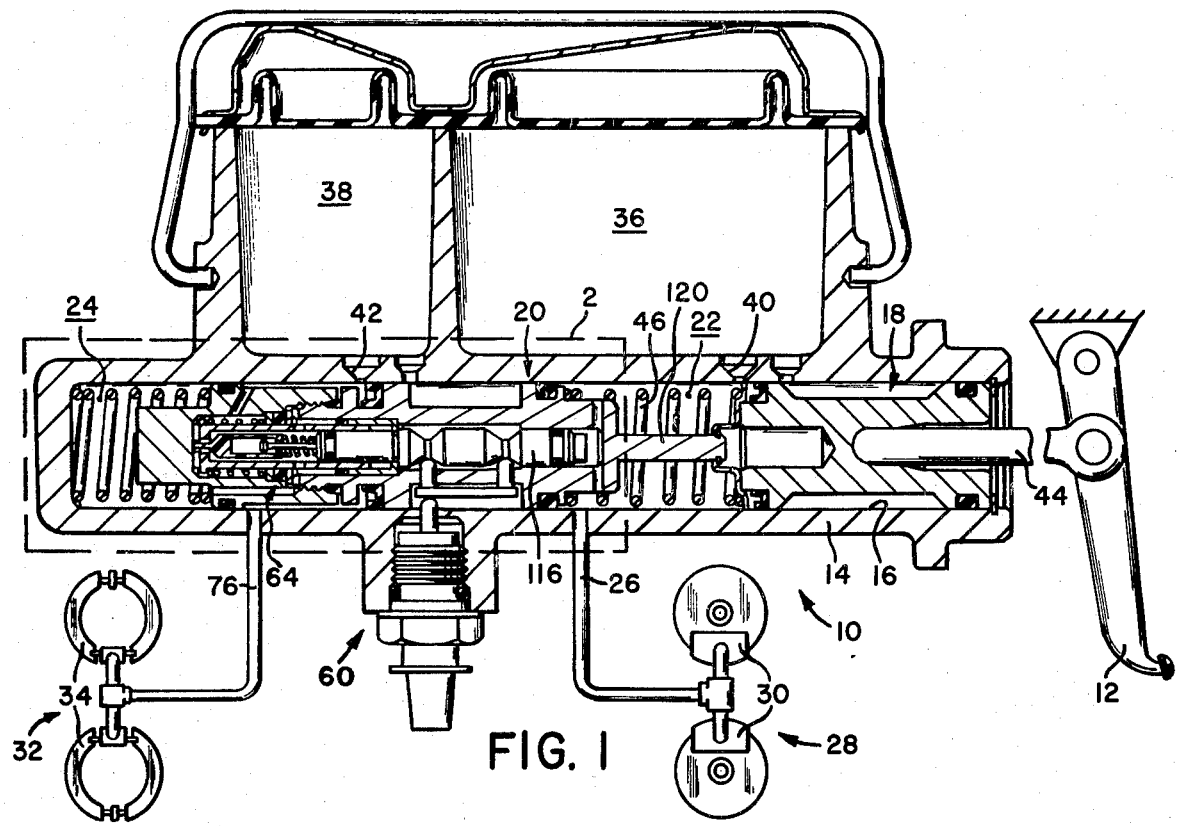
FIG. 1 is a side view of a master cylinder incorporating the proportioning valve assembly of the present invention within a piston.

In the brake system of FIG. 1, a fluid pressure generator 10, such as a master cylinder, is coupled to a pedal 12 for actuation by a vehicle operator. The fluid pressure generator defines a housing 14 which forms a bore 16. The bore 16 movably receives a pair of pistons, 18 and 20, which cooperate with the housing 14 to substantially define a pair of pressure chambers, 22 and 24. The primary pressure chamber 22 communicates via outlet 26 with a brake assembly 28, such as a front wheel disc brake 30, while the secondary pressure chamber 24 communicates with a brake assembly 32, such as a rear wheel drum brake 34. As will be described hereinafter, the secondary pressure chamber 24 does not communicate directly with the brake assembly 32.

The housing 14 includes a pair of reservoirs at 36 and 38 which communicate with the pressure chambers 22 and 24, respectively, via ports 40 and 42. In the neutral or rest position illustrated, the port 40 communicates fluid within reservoir 36 to the primary pressure chamber 22 and the port 42 communicates fluid within reservoir 38 to the secondary pressure chamber 24. A linkage 44 cooperates with the pedal 12 such that pivoting the pedal 12 imparts movement to the first piston 18 in order to pressurize the fluid within the primary pressure chamber 22, the port 40 being closed by the movement of the first piston 18. In response to the fluid pressure within primary pressure chamber 22 and a resilient connection via spring 46, the second piston is moved to pressurize the fluid within the secondary pressure chamber 24. As a result pressurized fluid is transmitted from the primary pressure chamber 22 to the brake assembly 28 and from the secondary pressure chamber 24 to the brake assembly 32.

Figure 2:
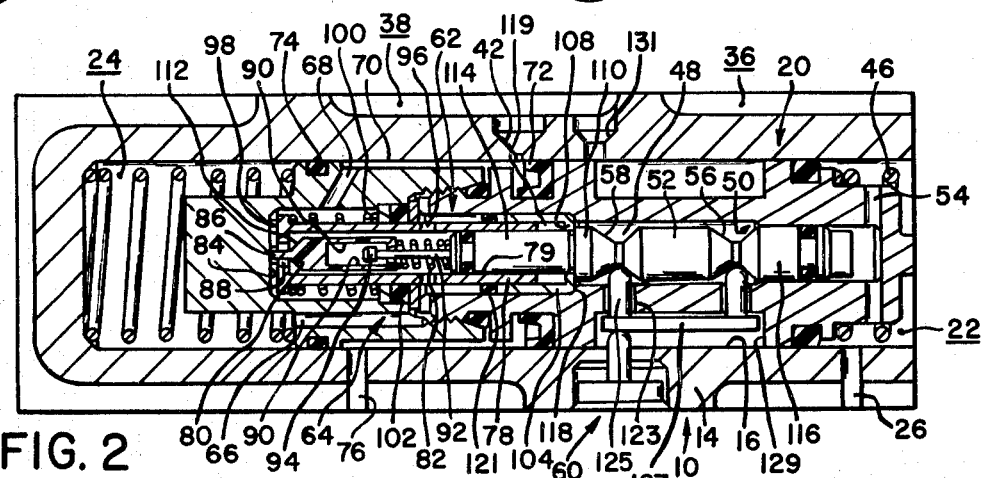
FIG. 2 is an enlarged view of the encircled portion of FIG. 1.

Turning to the enlarged view of FIG. 2, the second piston 20 includes a cavity 48 which defines a stepped bore 50. A shuttle member 52 is movably disposed within a small diameter portion of the stepped bore 50 and is exposed to the primary pressure chamber 22 via openings 54. The shuttle member 52 is formed with tapered grooves at 56 and 58 to cooperate with a warning indicator assembly 60 as more fully described in U.S. Pat. No. 4,078,384.

In accordance with the invention, the second piston carries a valve assembly 62 within the stepped bore 50. The valve assembly cooperates with a passage 64 to control fluid communication between the secondary pressure chamber 24 and the brake assembly 32. The passage 64 extends from a port 66 which opens to the secondary pressure chamber 24 to a port 68 which opens to recess 70 formed between the housing bore 16 and the second piston 20 by sealing rings 72 and 74. An outlet 76 communicates the recess 70 with the brake assembly 32 so as to provide fluid communication between the secondary pressure chamber 24 and the brake assembly 32.

The valve assembly 62 comprises a sleeve 78 which movably receives the shuttle member 52 at one end of a bore 79 and a pilot member 80 disposed within the sleeve bore 79 is biased by spring 82 to abut the end wall 84 of stepped bore 50. A projection 86 on the pilot member extends through an opening 88 on the sleeve 78 and a cavity 90 on the pilot member receives a stem 92 of the shuttle member 52. The stem 92 forms an enlarged end 94 to define an interlocking fit between the pilot member 80 and the shuttle member 52 so as to connect the one with the other. Openings at 96 on the sleeve and cutouts at 98 on the left end of the sleeve provide for fluid communication from port 66 to port 68. A spring 100 normally biases the sleeve 78 towards the end wall 84.

The valve assembly 62 is disposed within a large diameter portion of the stepped bore 50 and a seal 102 sealingly engages the outer diameter of the sleeve 78 to provide for fluid communication from the port 66 to the port 68 only through the inside of sleeve 78. A ring element 104 forms a bore 106 to movably receive the sleeve 78 and a radially inturned flange 108 is engageable with a ridge 110 on the shuttle member 52. The ring element 104 is biased by pressure within the passage 64 so as to abut the radially inturned flange against the shoulder 118. The sleeve 78 and the ring element 104 cooperate with the shuttle member 52 to define a chamber 119. A seal 121 is exposed to the passage 64 to bias the ring element to the right while at the same time sealingly engaging the outer diameter of the sleeve 78 and the larger bore of stepped bore 50. The cavity 119 is vented to the cavity 78 via clearances between the radially inturned flange 108 and the ridge 110. The cavity 48 is in communication with the reservoir 38 via openings 123 which receive projections 125 of a warning indicator sleeve 127. A recess 129 between the bore 16 and the piston 20 opens to the reservoir 38 via port 131 and clearances between the sleeve 127 and the recess 129 provide for fluid communication between the openings 123 and the port 131. Consequently, the cavity 119 is vented to the reservoir 38.

MODE OF OPERATION

When the brake pedal 12 is rotated to initiate a braking application, the linkage 44 moves the first piston 18 to the left to close the port 40 and pressurize fluid trapped within the primary pressure chamber 22 so as to communicate pressurized fluid to the brake assembly 28. The pressurized fluid within the primary pressure chamber 22 and the contraction of spring 46 bias the second piston 20 to the left to close the port 42 and pressurize fluid trapped within the secondary pressure chamber 24.

The pressurized fluid trapped within the secondary pressure chamber 24 communicates with the inner bore 79 of the sleeve 78 via port 66 and openings 96. From within the sleeve 78 the pressurized fluid communicates through the opening 88, cutouts 98, port 68, recess 70, and outlet 76 to reach the brake assembly 32. Pressurized fluid within the passage 64 near the cutouts 98 acts against the sleeve 78 exposed to the pressurized fluid as defined by the outer diameter of the sleeve at seal 102 and the portion 114 of the shuttle member 52 to create a force biasing the sleeve 78 toward the right against spring 100. As a result the sleeve is moved to the right to position opening 88 adjacent a tapered surface 112 on the pilot member 80 to vary or restrict fluid communication to the brake assembly 32. Thereafter, further increases in braking pressure in chamber 24 are communicated to the sleeve bore 79 so that the sleeve 78 is urged to the left to communicate the increased fluid within chamber 24 to the brake assembly 32. The increased fluid within the sleeve bore 79 opposes existing forces created by the pressurized fluid acting across the sleeve at seal 102 upstream of the restricted opening 88 to move the sleeve to the left, thereby reducing the restriction or variation of fluid communication through opening 88. Consequently, during a braking application, the pressure level of pressurized fluid communicated to the brake assembly 32 is proportionally less than the pressurized fluid communicated to the brake assembly 28. This condition is required to account for the moment created for a vehicle during braking, so that the front disc brake assembly 28 performs a majority of the braking for the vehicle.

During a braking application the shuttle member 52 is exposed to pressurized fluid within primary pressure chamber 22 via openings 54 and is exposed to pressurized fluid within the secondary pressure chamber 24 via port 66 and openings 96. As the shuttle member diameter at 114 across the inner diameter of sleeve 78 is smaller than at 116 and the pressure level within each chamber is substantially equal, the shuttle member 52 is biased to the left to engage the ridge 110 with the ring element 104. The ring element 104 is exposed to pressurized fluid within the large diameter portion of stepped bore 50 radially outwardly of the sleeve 78. The area of the ring element 104 and the shuttle member 52 which are exposed to the pressurized fluid within secondary pressure chamber 24 is greater than the area of the shuttle member 52 which is exposed to the primary pressure chamber 22. As a result the ring element is maintained in abutment with a shoulder 118 of the stepped bore 50 and the shuttle member 52 is maintained in a neutral position to abut the ridge 110 with the inturned flange 108, when the pressure level within chamber 24 is substantially equal to the pressure level within chamber 22, even though the pressurized fluid communicated to the brake assembly 32 is less than the pressurized fluid communicated to the brake assembly 28.

If the pressure level of pressurized fluid within the primary pressure chamber 22 is insufficient due to a leak in the line connecting with the brake assembly 28, the first piston 18 is engageable with a rod 120 to impart movement to the second piston 20. The second piston pressurizes the fluid trapped within the secondary pressure chamber 24. As a result the shuttle member 52 is exposed to pressurized fluid within chamber 22 at portion 114 via passage 64 and sleeve bore 79 and insufficient pressurized fluid within chamber 24 at portion 116 via openings 54 and the right end of stepped bore 50. A pressure differential between the pressure chambers 22 and 24 is created so as to move the shuttle member 52 to the right within the stepped bore 50. The movement of the shuttle member 52 to the right moves the pilot member 80 to the right in view of the interlocking fit with the enlarged head 94. Consequently, when the pressurized fluid at the end wall 84 biases the sleeve 78 to move to the right, the projection and tapered surface 112 are spaced from the opening 88 to permit unrestricted fluid communication from the secondary pressure chamber to the brake assembly 32.

ALTERNATE EMBODIMENT

Figure 3:
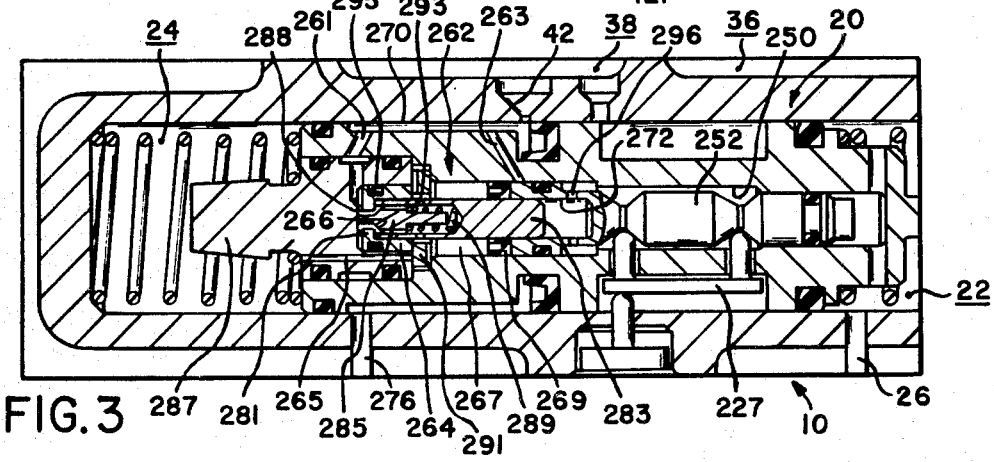
FIG. 3 is an enlarged view similar to FIG. 2 showing an alternative embodment.

Turning to FIG. 3, the valve member 262 includes a pressure responsive member 264 which is movable in response to pressurized fluid within the secondary pressure chamber to approach a tapered seat 266 so as to restrict fluid communication to the outlet 276 via passageway 261. The pressure responsive member 264 comprises a first portion 281 and a second portion 283 which are press fit together, the first portion 281 having a larger diameter than the second portion 283. The tapered seat 266 is formed on a stem 285 which is fastened to a plug 287. A spring 289 biases the pressure responsive member 264 to the right and a spring washer 291, which defines a larger spring constant than spring 289, biases the pressure responsive member 264 to the left.

When the fluid trapped within chamber 24 is pressurized as the second piston 20 is moved to the left, the trapped pressurized fluid is communicated via passageway 265, openings 293, opening 288, and passage 261 to the outlet 276. Pressurized fluid at the first portion 281 acts across seal 295 to bias the pressure responsive member to move against spring washer 291. Consequently, the pressure responsive member 264 approaches the seat 266 to reduce the communication of pressurized fluid through the opening 288. Thereafter, communication of pressurized fluid to the outlet 276 is proportioned as described for the preferred embodiment.

If an undesirable pressure drop occurs in the primary pressure chamber 22, the shuttle member 252 is pressure responsive to move to the right and the seal 269 moves to the right in response to pressure within a center chamber 267 to uncover a bypass passageway 263 so that the pressurized fluid within the secondary pressure chamber is communicated directly to the outlet 276 via passageway 265, a center chamber 267 within the second piston, the passageway 263 and a recess 270, independently of the opening 288. When the undesirable pressure drop occurs in the primary pressure chamber 22, the communication of pressurized fluid from the secondary pressure chamber 24 to the outlet 276 is established independently of the restriction provided between the pressure responsive member 264 and the tapered seat 266, so that no proportioning occurs.

The shuttle member 252 forms a blind bore 272 for movably receiving the second portion 283 of the pressure responsive member 264. The blind bore 272 communicates via openings 296 with the stepped bore 250 so that the blind bore 272 is vented to the reservoir 38 via sleeve 227 in a similar manner as in FIG. 2.

In both embodiments the second piston 20 includes passages or passageways which communicate the secondary chamber with the one brake assembly. Moreover, the second piston carries a valve member therein to restrict fluid communication to the one brake assembly when the pressure chambers are substantially equal in pressure level and a shuttle member cooperates with the piston to provide unrestricted fluid communication to the one brake assembly when an undesirable pressure drop occurs in the primary pressure chamber.

Although the foregoing description proceeds with reference to the accompanying drawings, it is feasible by one skilled in the art to provide many modifications and/or variations to these drawings, and as such, these modifications and/or variations are intended to fall within the scope of the appended claims.

We claim:

1. In a fluid pressure generator for a brake assembly, said pressure generator having a housing which movably carries a first and a second piston, the first piston cooperating with the housing and the second piston to substantially define a primary chamber and the second piston cooperating with the housing to substantially define a secondary chamber, the first piston being movable within the housing to pressurize fluid within the primary chamber and the second piston being movable in response to the pressurized fluid within the primary chamber to pressurize fluid within the secondary chamber, the second piston carrying a valve assembly which is exposed to the secondary chamber, the improvement wherein the second piston includes passage means communicating the secondary chamber with the brake assembly via the valve assembly, said valve assembly being movable between a first position in which it is responsive to fluid pressure within said secondary chamber to substantially close said passage means when a predetermined pressure is reached in said secondary chamber and being shiftable to a second position in which said passages means communicates the secondary chamber with the brake assembly, said valve assembly including a sleeve with a bore and an opening, said sleeve being movable within the second piston, a pilot member shiftably received in said bore and cooperating with said sleeve opening to control fluid communication between the secondary chamber and the brake assembly.

2. The fluid pressure generator of claim 1 in which the second piston also carries a shuttle member which is movable within the second piston and engageable with the valve assembly to move the latter to one of the positions.

3. The fluid pressure generator of claim 2 in which the sleeve bore receives said shuttle member.

4. In a fluid pressure generator having a housing which cooperates with a pair of pistons to substantially define a pair of pressure chambers, the pair of pistons being movable within the housing to pressurize fluid within the pair of pressure chambers and each of the pair of pressure chambers communicating pressurized fluid to a respective brake assembly, the improvement wherein one of the pair of pistons carries a valve assembly movable therewith and the one piston includes passage means to provide the fluid communication between one of the pair of pressure chambers and the respective brake assembly via said valve assembly within said one of the pair of pistons, said valve assembly including a sleeve with an opening and a pilot member, said pilot member cooperating with said sleeve opening to control fluid communication between said one pressure chamber and the respective brake assembly and cooperating with a shuttle member which is responsive to the fluid pressure within the pair of pressure chambers so as to be movable relative to said sleeve, said shuttle member and said pilot member being movably disposed within said sleeve.

5. The fluid pressure generator of claim 4 in which a ring element cooperates with said shuttle member to bias the latter to move within the housing in response to the pressure within the one pressure chamber.

6. The fluid pressure generator of claim 5 in which said ring element forms a bore to movably receive said sleeve and said shuttle member.

7. In a fluid pressure generator having a housing with a bore for movably supporting a pair of pistons, the housing defining a reservoir which communicates fluid therein to the bore, the pair of pistons cooperating with the housing to substantially define a pair of pressure chambers, the pair of pistons being movable within the housing to pressurize fluid within each pressure chamber so as to communicate the pressurized fluid to a respective brake assembly, the improvement wherein one of the pair of pistons includes a pressure responsive member having a first area exposed to the pressurized fluid within one of the pair of pressure chambers, a second area exposed to the pressurized fluid within the one pressure chamber and a third area exposed to the reservoir, said one piston and said pressure responsive member defining passage means communicating the one pressure chamber with its respective brake assembly, said pressure responsive member being movable in response to the pressurized fluid within the one pressure chamber to vary fluid communication through said passage means, said one piston movably carrying a shuttle member and said pressure responsive member defining a bore for receiving said shuttle member, the one piston also carrying a ring element which cooperates with said shuttle member and said pressure responsive member to define the third area on said pressure responsive member.

8. A master cylinder for a vehicle having a pair of brake assemblies, said master cylinder comprising:
 a housing with a bore having a closed end and a fluid reservoir communicating with said bore;
 a pair of pistons received in said bore and defining a first pressure chamber therebetween, one of said pistons cooperating with the closed end of said bore to define a second pressure chamber; said first and second pressure chambers communicating with respective brake assemblies;
 said one piston defining a passage to provide the fluid communication between the second pressure chamber and the respective brake assembly via a valve assembly within said one piston; said valve assembly including a sleeve member movably received in a bore defined in said one piston and a pilot member movably received within said sleeve, said sleeve defining a part of said fluid passage and having a stepped bore defining an axial opening, said pilot member including a projection extending through said axial opening and contacting an abutment and a tapered portion cooperating with said sleeve opening to control fluid communication through said passage, said sleeve having an area exposed to the fluid pressure in said passage and an area exposed to the fluid pressure in said reservoir and being responsive to a pressure difference between said passage and reservoir to move between a first position wherein said sleeve opening is spaced from said pilot member to allow free flow of fluid through said passage and shifting to a second position responsive to a predetermined pressure difference wherein said sleeve opening and said pilot member close said passage.

9. The master cylinder of claim 8 and a shuttle member movably received in said piston bore and exposed to the fluid pressures in said first and second pressure chambers, said shuttle member being movable relative to said one piston responsive to a pressure difference between said pressure chambers, means connecting said pilot member and said shuttle member for moving said pilot member away from said abutment and sleeve opening responsive to movement of said shuttle member relative said one piston.

* * * * *